United States Patent
Jouanet et al.

(10) Patent No.: US 7,406,869 B2
(45) Date of Patent: Aug. 5, 2008

(54) MOVEMENT DETECTOR HAVING SIX DEGREES OF FREEDOM WITH THREE POSITION SENSORS AND METHOD FOR THE PRODUCTION OF A SENSOR

(75) Inventors: Laurent Jouanet, Autrans (FR); Patrice Rey, Saint-Jean-de-Moirans (FR)

(73) Assignee: Commissariat A l'Energie Atomique, Paris (FR)

( * ) Notice: Subject to any disclaimer, the term of this patent is extended or adjusted under 35 U.S.C. 154(b) by 214 days.

(21) Appl. No.: 10/575,862

(22) PCT Filed: Oct. 25, 2004

(86) PCT No.: PCT/FR2004/002736

§ 371 (c)(1),
(2), (4) Date: Apr. 14, 2006

(87) PCT Pub. No.: WO2005/045868

PCT Pub. Date: May 19, 2005

(65) Prior Publication Data

US 2007/0039387 A1     Feb. 22, 2007

(30) Foreign Application Priority Data

Oct. 28, 2003    (FR) .................................... 03 12618

(51) Int. Cl.
*G01P 3/04*     (2006.01)
(52) U.S. Cl. .......................................... 73/510; 29/595
(58) Field of Classification Search ............... 73/510; 29/595
See application file for complete search history.

(56) References Cited

U.S. PATENT DOCUMENTS

| | | | |
|---|---|---|---|
| 4,543,457 A * | 9/1985 | Petersen et al. ............ 200/83 N |
| 4,601,206 A * | 7/1986 | Watson ......................... 73/510 |
| 4,787,051 A * | 11/1988 | Olson .......................... 345/179 |
| 5,128,671 A * | 7/1992 | Thomas, Jr. ................... 341/20 |
| 5,610,337 A * | 3/1997 | Nelson ......................... 73/651 |
| 5,821,419 A * | 10/1998 | Mader et al. .................. 73/493 |
| 5,854,622 A | 12/1998 | Brannon |
| 5,880,368 A * | 3/1999 | FitzPatrick ................... 73/493 |
| 6,230,564 B1 * | 5/2001 | Matsunaga et al. ........ 73/514.01 |

FOREIGN PATENT DOCUMENTS

| | | |
|---|---|---|
| EP | 0 997 737 A1 | 5/2000 |
| FR | 2 733 321 | 10/1996 |
| WO | WO 95/27217 | 10/1995 |
| WO | WO 96/06328 | 2/1996 |

* cited by examiner

*Primary Examiner*—Hezron E. Williams
*Assistant Examiner*—Samir M. Shah
(74) *Attorney, Agent, or Firm*—Oliff & Berridge, PLC

(57) ABSTRACT

The movement detector having six degrees of freedom comprises a support on which three position sensors are arranged according to three orthogonal axes. Each sensor comprises a rigid body (3), a deformable element (4) which is electrically conductive, and four conductive areas (6*b*) which are disposed on rigid walls (3). The deformable element (4) is balanced around the centre part thereof and has a rest position and four active positions wherein it is temporarily in contact with two of the conductive areas (6*b*) of the rigid body (3). The deformable element (4) of a sensor moves from a rest position to one of the active positions in response to a predetermined directional or axial translation or votation.

11 Claims, 7 Drawing Sheets

MOVEMENT DETECTOR HAVING SIX DEGREES OF FREEDOM WITH THREE POSITION SENSORS AND METHOD FOR THE PRODUCTION OF A SENSOR

BACKGROUND OF THE INVENTION

The invention relates to a movement detector with six degrees of freedom comprising a support on which three position sensors are arranged disposed along three axes, each sensor comprising a rigid body, conducting areas disposed on the rigid body and an electrically conducting deformable element, presenting a rest position wherein it is isolated from the conducting areas, and moving from the rest position to an active position in response to a high-speed movement of predetermined direction and orientation.

The invention also relates to a method for production of a sensor.

BACKGROUND ART

In the field of movement detectors with six degrees of freedom, the detectors are equipped with position sensors continuously transmitting measurements to obtain precise positioning values. Known detectors respond to a mechanical solicitation, for example an action on a handle, to obtain a movement indication.

Thus the document U.S. Pat. No. 5,854,622 describes a measuring apparatus comprising a handle on which a user acts and detecting movements with six degrees of freedom, wherein the sensors used are variable resistors or capacitors fitted on mechanical axes.

The document U.S. Pat. No. 5,128,671 describes a movement detector with several degrees of freedom comprising six accelerometers integrated in a joystick type solid. Two accelerometers are arranged on each reference axis of the detector and are sensitive to a single movement corresponding to this particular axis. The accelerometers are formed for example by flexible cantilevers.

The apparatuses described above enable continuous variations to be detected and require an action on a mechanical axis. They are completely unsuitable for detection of small impulse movements, of small amplitude, undergone by a solid and caused for example by impacts or high-speed movements.

Moreover, the document U.S. Pat. No. 5,610,337 describes an accelerometer comprising a sensitive element formed by a rocking beam in equilibrium on its central part. This type of accelerometer enables a rotation or a translation to be detected with respect to a single axis.

SUMMARY

It is an object of the invention to provide a detector not presenting these drawbacks and, in particular, a movement detector with six degrees of freedom enabling impulse movements to be detected.

According to the invention, this object is achieved by a detector according to the appended claims and more particularly by the fact that the deformable element is in equilibrium around its central part and comprises a plurality of active positions, each active position corresponding to two degrees of freedom, the deformable element being temporarily in contact with two of the conducting areas in each active position.

According to a preferred embodiment, the rigid body of a sensor comprises two substrates arranged face to face, connected by balls constituting an electrical interconnection between the conducting areas of one of the substrates and output electrical contact areas formed on the other substrate.

It is a further object of the invention to provide a method for production of a sensor, wherein production of the sensor comprises:
formation on each of the substrates of conducting areas, of power supply contact areas and, on one of the substrates, of output electrical contact areas,
formation on each of the substrates of a central pillar in contact with the power supply contact area and supporting a conducting layer designed to form a deformable half-element,
installation of balls on the output electrical contact areas,
hybridization of the two substrates arranged face to face.

BRIEF DESCRIPTION OF THE DRAWINGS

Other advantages and features will become more clearly apparent from the following description of particular embodiments of the invention given as non-restrictive examples only and represented in the accompanying drawings, in which.

DETAILED DESCRIPTION OF THE EMBODIMENTS

Figure 1:
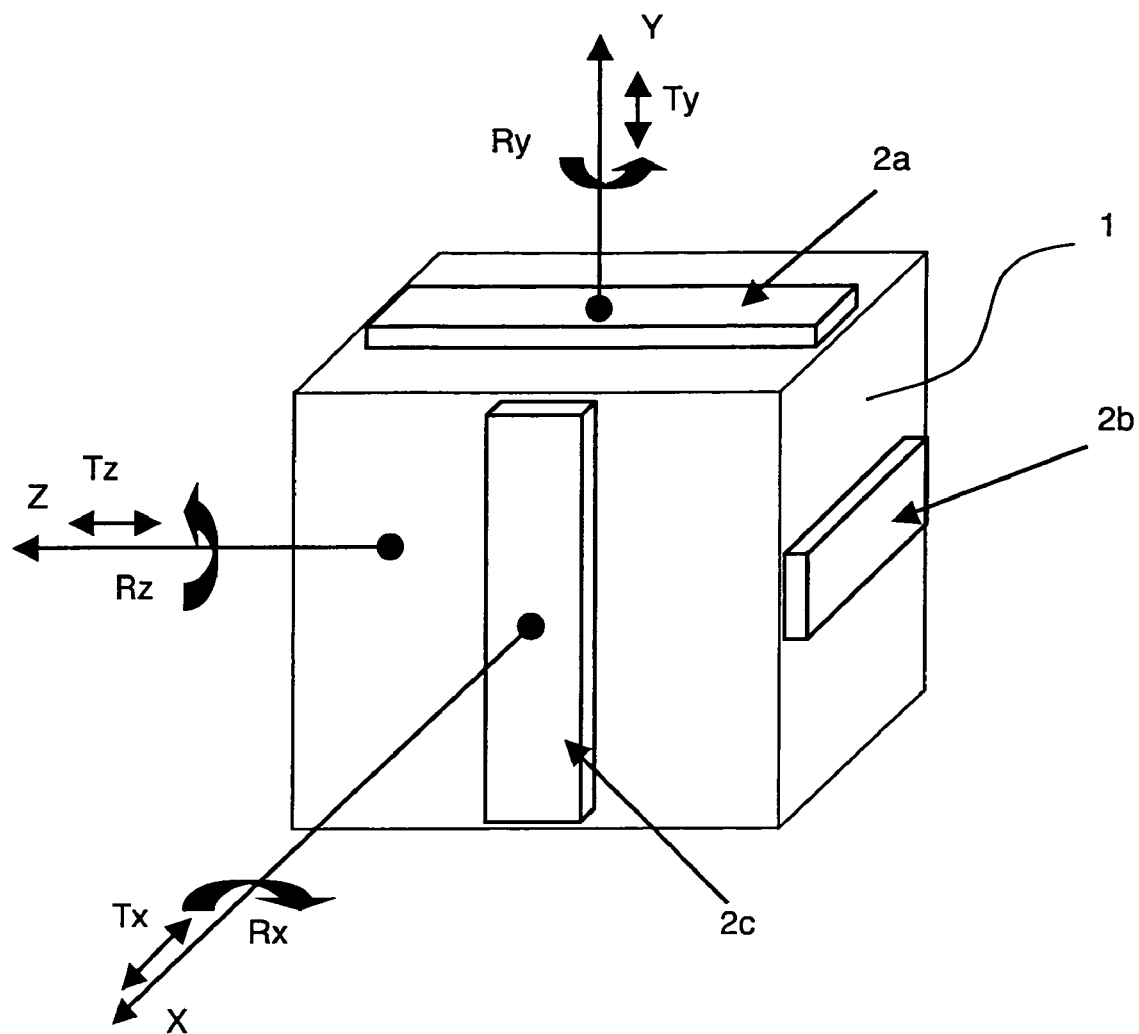
FIG. 1 is a schematic perspective view of a particular embodiment of a movement detector with three position sensors according to the invention.

According to FIG. 1, the movement detector with six degrees of freedom comprises a support 1, on which three position sensors 2a, 2b and 2c are mounted along three orthogonal axes X, Y and Z. Each sensor is sensitive, from a certain threshold, to impulses registered according to two particular degrees of freedom, i.e. to a translation and to a rotation. The sensor 2a, or "RxTy" sensor, is sensitive to a rotation on the X axis and a translation on the Y axis. The sensor 2b, or "RyTz" sensor, is sensitive to a rotation on the Y axis and a translation on the Z axis. And the sensor 2c, or "RzTx" sensor, is sensitive to a rotation on the Z axis and a translation on the X axis.

To detect these impulses, each position sensor 2 uses the balance principle represented in FIGS. 2 to 7. Each sensor 2 is formed by a rigid body 3 inside which a deformable element 4 is normally kept in equilibrium (FIGS. 2 and 3) around a central point by means of a support means composed of two parts 5a and 5b that are symmetrical with respect to the deformable element 4 and fixedly secured to the rigid body 3. Part 5b of the support means is electrically connected to an electric power supply circuit delivering a DC voltage +Vdc.

Figure 8:
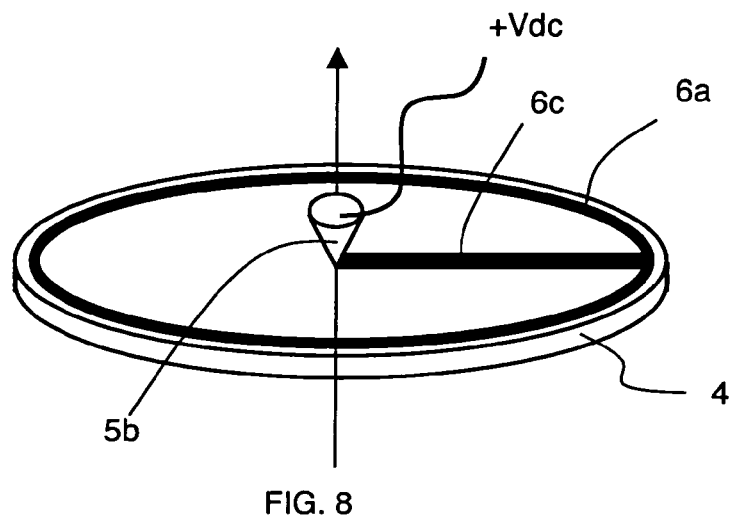
FIGS. 8 and 9 represent perspective views of a deformable element, respectively in the form of a disk and in the form of a beam, of a sensor according to FIG. 2.
Figure 9:
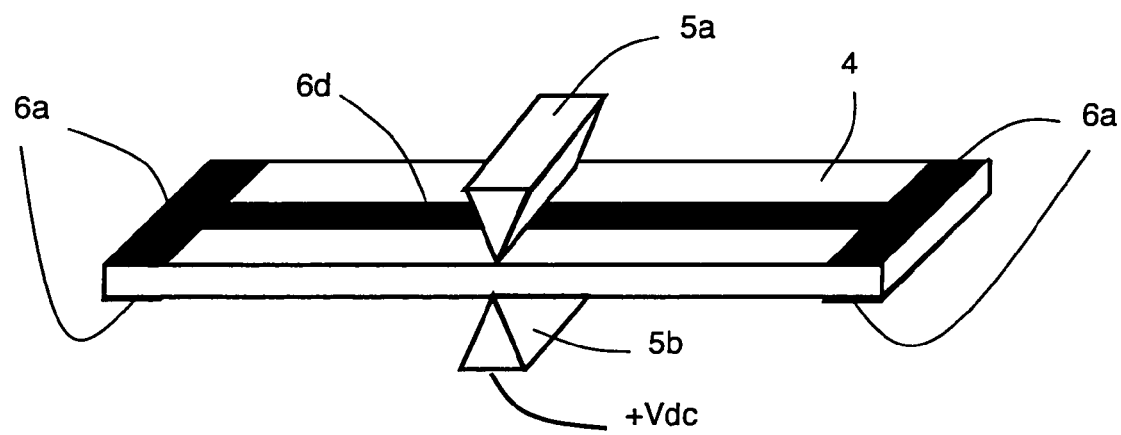

Conducting areas 6a and 6b are arranged respectively on the rigid body 3 (areas 6b) and on the deformable element 4 (areas 6a). What is meant by deformable element is any flexible body of small thickness able to oscillate around its rest position, represented in FIGS. 2 and 3, and reverting to its original position without having undergone any irreversible deformation. The deformable element 4 can in particular have the form of a disc, as shown in FIG. 8, or the form of a beam, as represented in FIG. 9. The conducting areas 6a of the deformable element 4 are electrically connected to the part 5b and can be situated for example on the circumference and at the ends of the deformable element 4 as shown in FIGS. 8 and 9. In the rest position of the deformable element 4, the conducting areas 6a of the deformable element 4 are isolated from the conducting areas 6b of the rigid body 3. The latter are placed inside the rigid body 3 and at predetermined locations so as to come into contact with the conducting areas 6a of the deformable element 4 selectively in the activation position of the sensor, as shown in FIGS. 4 to 7.

In the particular embodiment represented in FIGS. 4 to 7, the rigid body 3 is substantially rectangular and hollow, with two inside walls substantially parallel to the deformable element 4 in the rest position. At least two conducting areas 6b are provided on each of these walls, respectively top and bottom.

In order not to be disturbed by the force of gravity G in the rest position, the deformable element 4 of a sensor 2 has to be sufficiently rigid not to bend under the effect of its own weight and not to come into contact with the rigid body 3 in the rest position. It is kept in equilibrium, in the rest position, for any movement the acceleration whereof remains at the most equal to the force of gravity G.

Figure 10:
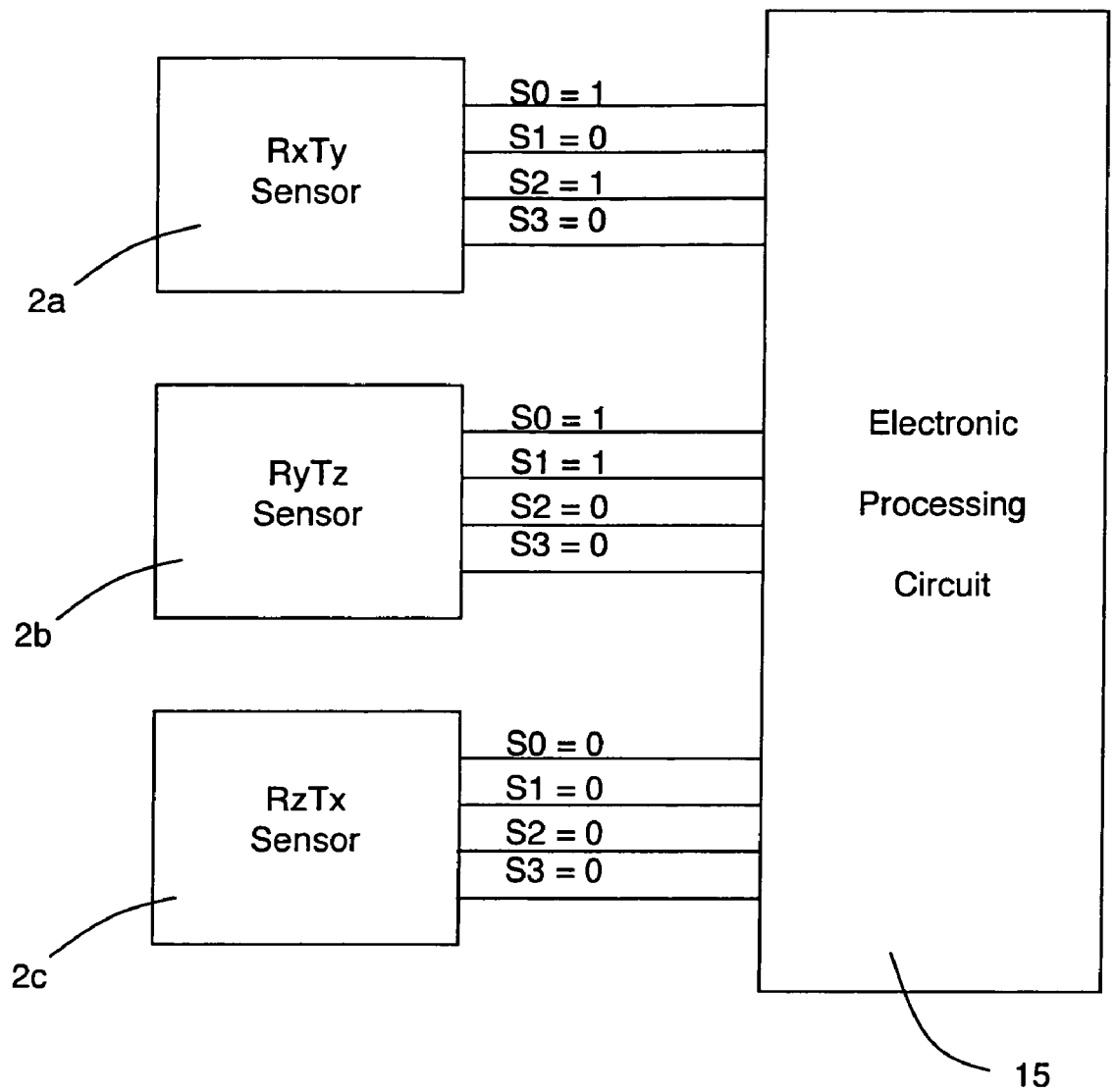
FIG. 10 schematically illustrates the electrical connections of the sensors to a processing circuit of a detector according to the invention.
Figure 11:
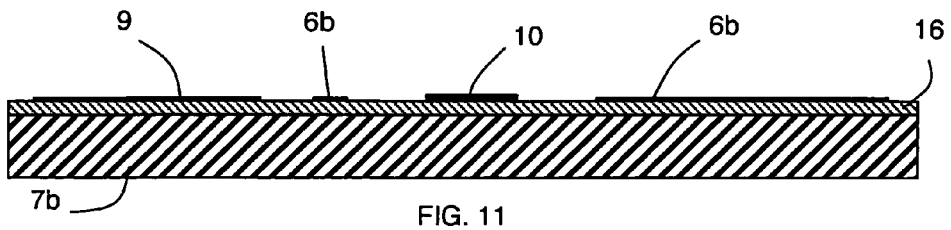
FIGS. 11 to 15 represent, in cross-section, five successive stages of manufacture of a sensor according to FIG. 2.

In a particular embodiment represented in FIGS. 2 to 10, when a rotational or translational movement exceeds a certain threshold, the conducting areas 6a of the deformable element 4 come into contact for a short moment with certain conducting areas 6b of the rigid body 3, by unbalance or deformation. The conducting areas 6a arranged on the deformable element 4 thus briefly come into contact with certain conducting areas 6b of the rigid body 3. This brief contact is detectable by an electronic processing circuit 15 connected to all the conducting areas 6b of the sensors 2 (FIG. 10). Each sensor sends back four signals S0, S1, S2 and S3 each corresponding to a conducting area 6b. In the rest position of the deformable element 4 of a sensor 2, all the conducting areas 6b are isolated from the conducting areas 6a and supply binary signals S0 to S3 to the electronic processing circuit 15, which signals take a first value, for example 0. When a conducting area 6b comes into contact with a conducting area 6a of the deformable element 4, it is then connected to the supply voltage +Vdc and supplies a corresponding signal having a second binary value (1 in the example considered). The electronic processing circuit 15 continuously analyses the signals S0 to S3 supplied by the different conducting areas 6b of the sensors 2 and deduces the type and the direction of movement therefrom. The correspondence between the possible movements of a sensor 2 and the associated signals S0 to S3 is represented in the following table:

|  | S0 | S1 | S2 | S3 |
| --- | --- | --- | --- | --- |
| Rest position (FIGS. 2 and 3) | 0 | 0 | 0 | 0 |
| Downwards translation (FIG. 4) | 0 | 1 | 0 | 1 |
| Upwards translation (FIG. 5) | 1 | 0 | 1 | 0 |
| Rotation to the left (FIG. 6) | 0 | 0 | 1 | 1 |
| Rotation to the right (FIG. 7) | 1 | 1 | 0 | 0 |

Thus, in the rest position (FIGS. 2 and 3), no contact is made between the conducting areas 6a of the deformable element 4 and the conducting areas 6b of the rigid body 3, and the four signals S0, S1, S2 and S3 are at 0. The binary combination 0000 is thus obtained.

Figure 4:
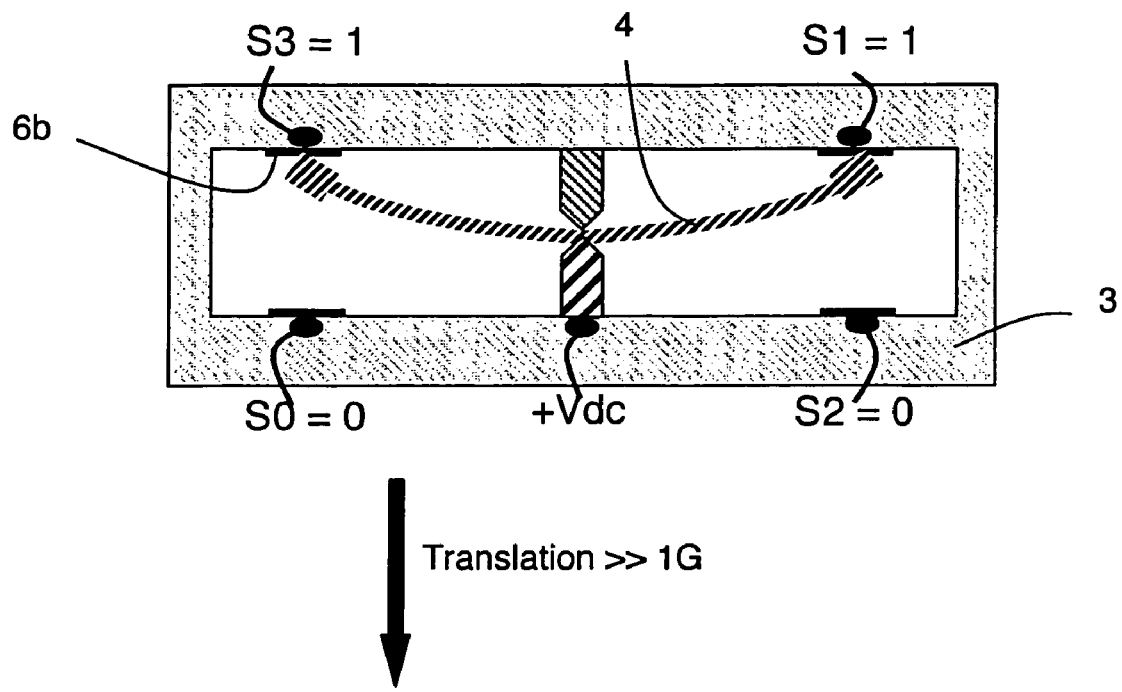
FIGS. 4 and 5 represent cross-sectional views of the sensor according to FIG. 2 in response to a translation, respectively downwards and upwards.
Figure 5:
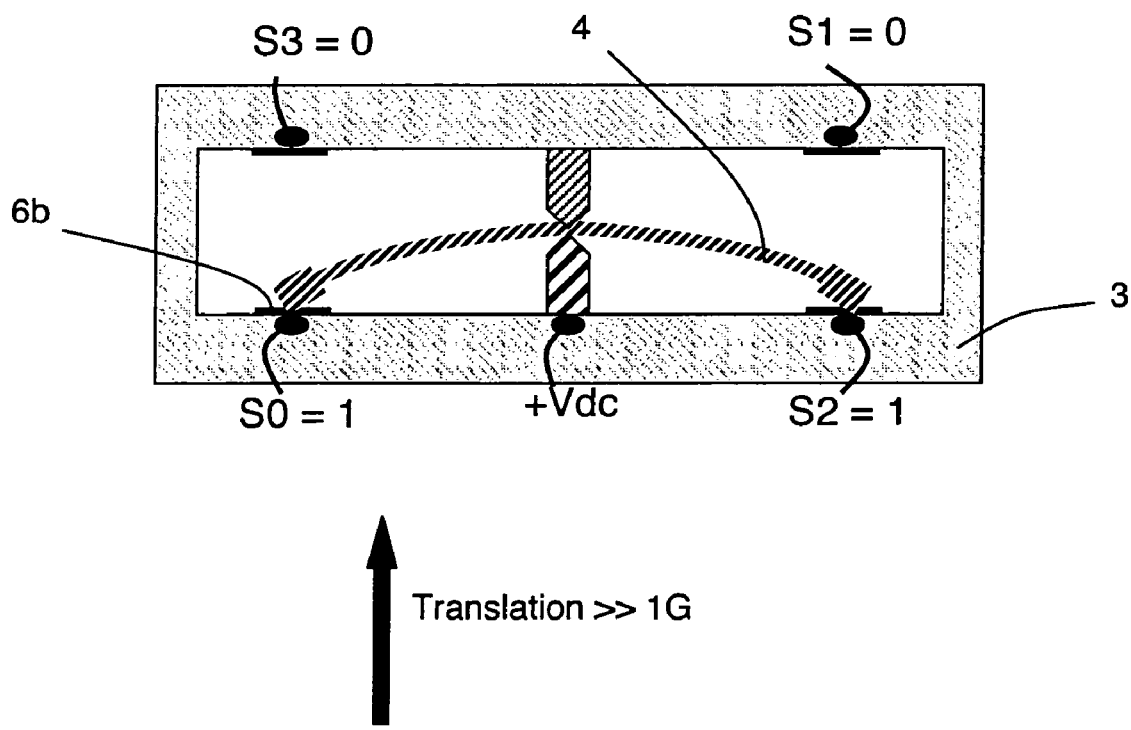

In FIGS. 4 and 5, the deformable element 4 bends respectively upwards and downwards so that its ends 6a come simultaneously into contact with two conducting areas 6b both located on the same side of the rigid body 3, respectively above the deformable element 4 and below the deformable element 4.

Figure 2:
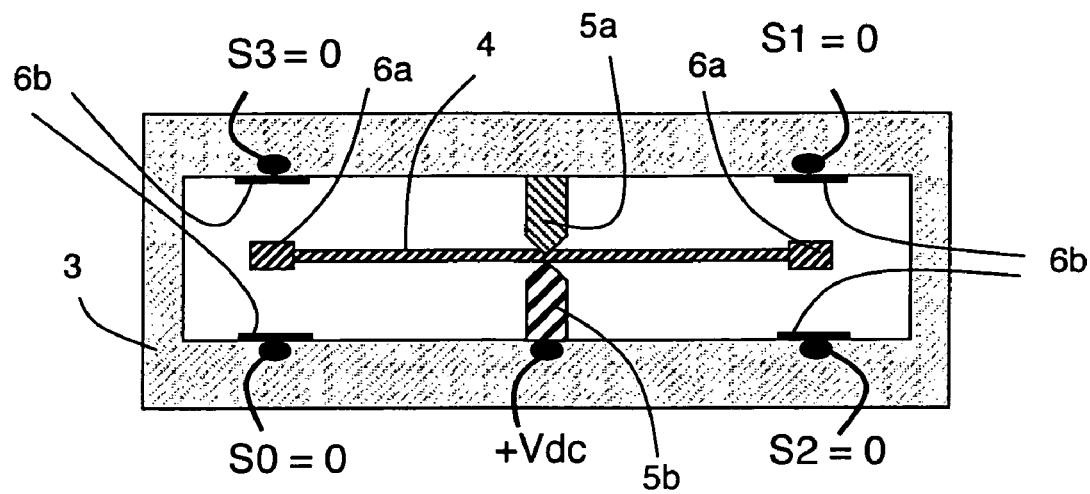
FIGS. 2 and 3 are cross-sectional views of a particular embodiment of a sensor according to FIG. 1, respectively in the horizontal rest position and in the vertical rest position.
Figure 3:
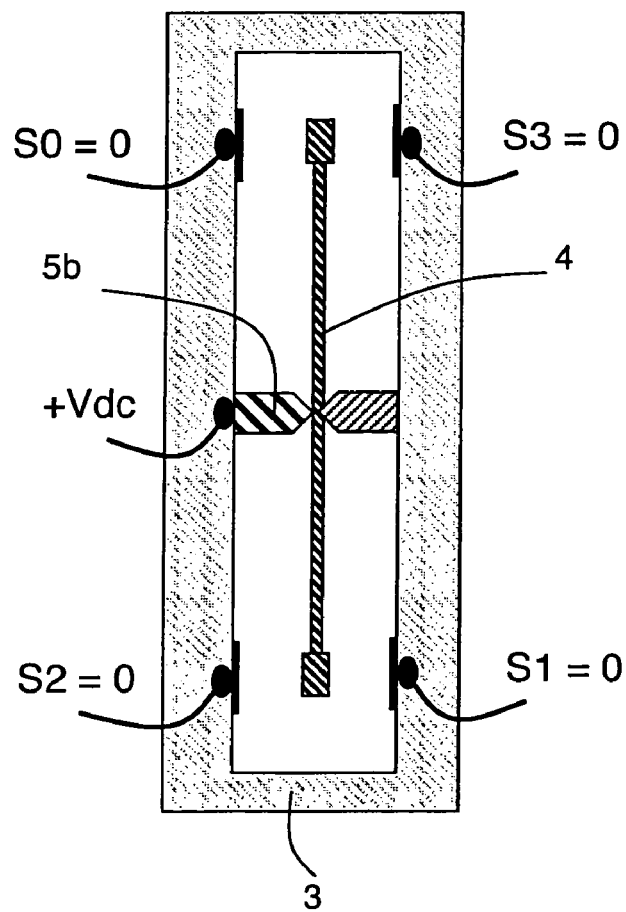

For a downwards translation (FIG. 4) of a sensor according to FIG. 2, the deformable element 4 comes into contact with the rigid body 3 at the level of the conducting areas 6b opposite to the direction of movement. The signals S1 and S3 are at 1 and the signals S0 and S2 are at 0. The binary combination 0101 is thus obtained.

For an upward translation (FIG. 5) of a sensor according to FIG. 2, the deformable element 4 also comes into contact with the rigid body 3 at the level of the conducting areas 6b opposite to the direction of movement. The signals S1 and S3 are at 0 and the signals S0 and S2 are at 1. The binary combination 1010 is thus obtained.

Figure 6:
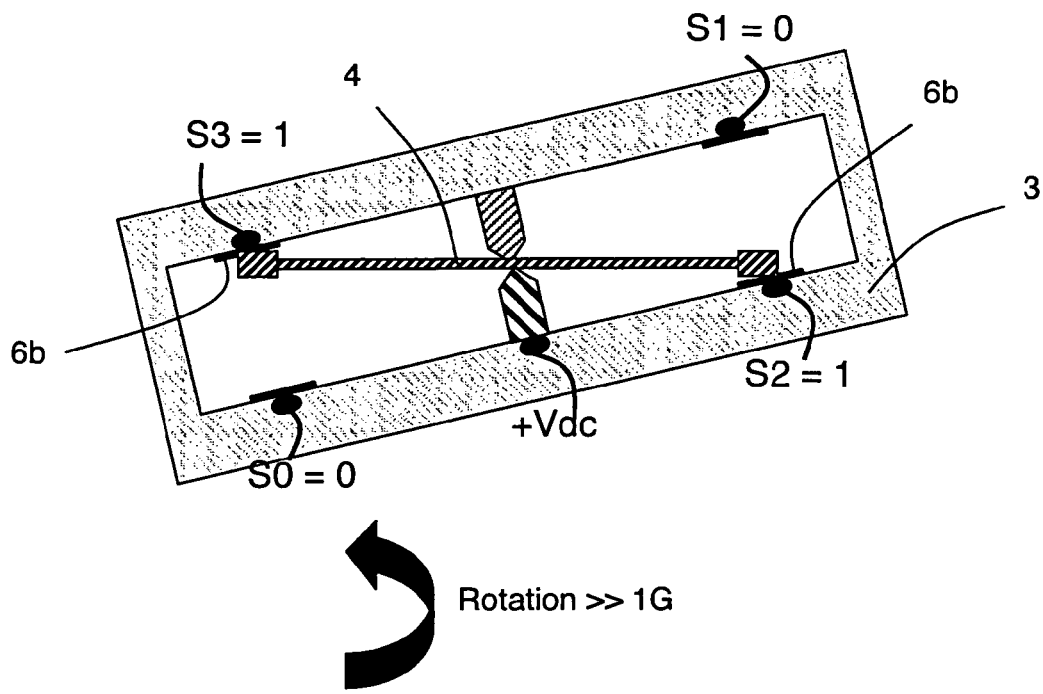
FIGS. 6 and 7 represent cross-sectional views of the sensor according to FIG. 2 in response to a rotation, respectively to the left and to the right.
Figure 7:
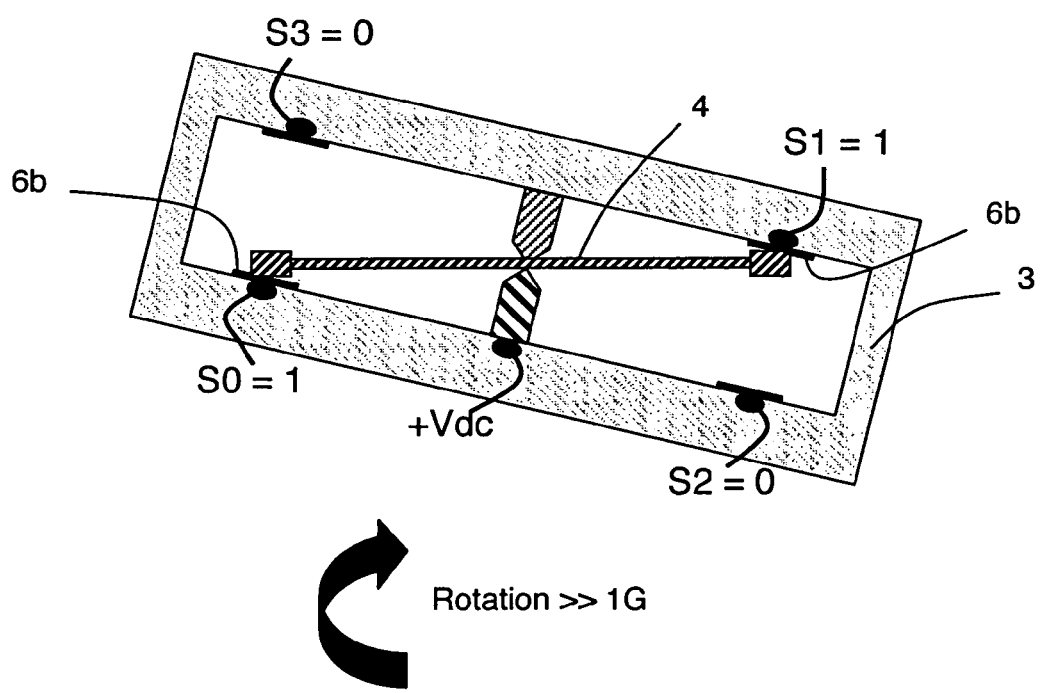

In FIGS. 6 and 7, the deformable element 4 pivots so that its ends 6a simultaneously come into contact with a conducting area 6b of the top wall of the rigid body 3 and with a conducting area 6b of the bottom wall of the rigid body 3.

For a rotation to the left (FIG. 6) of a sensor according to FIG. 2, the deformable element 4 comes into contact with the rigid body 3 at the level of two conducting areas 6b situated on opposite faces. The signals S2 and S3 are at 1 and the signals S0 and S1 are at 0. The binary combination 0011 is thus obtained.

For a rotation to the right (FIG. 7) of a sensor according to FIG. 2, the deformable element 4 comes into contact with the rigid body 3 at the level of two other conducting areas 6b situated on opposite faces. The signals S2 and S3 are then at 0 and the signals S0 and S1 are at 1. The binary combination 1100 is thus obtained.

Thus, according to FIG. 10, if for example the sensor 2a ("RxTy" sensor) supplies the combination 1010, the sensor 2b ("RyTz" sensor) the combination 1100 and the sensor 2c ("RzTx" sensor) the combination 0000, then the electronic processing circuit 15 deduces therefrom that the sensor 2a has undergone an upward translation, i.e. a translation in the positive direction along Y, that the sensor 2b has undergone a rotation to the right, i.e. a rotation in the positive direction along Y and that the sensor 2c is in the rest position. This is then interpreted as a movement of the support 1 in translation along +Y with a rotation according to +Y.

In another example, not represented, if the sensor 2a ("RxTy" sensor) supplies the combination 0011, the sensor 2b ("RyTz" sensor) the combination 0101 and the sensor 2c ("RzTx" sensor) the combination 0101, then the electronic processing circuit 15 deduces therefrom that the sensor 2a has undergone a rotation to the left, i.e. a rotation in the negative direction along X, that the sensor 2b has undergone a downward translation, i.e. a translation in the negative direction along Z and that the sensor 2c has undergone a downward translation, i.e. a translation in the negative direction along X. This is then interpreted as a movement of the support 1 in translation and in rotation according to −X, coupled with a translation along −Z.

In the particular embodiment represented in FIG. 8, the deformable element 4 is a disc of small thickness in equilibrium around its central axis. The conducting areas 6a are arranged on the circumference, or periphery, of the two faces of the disc and are connected to the part 5b of the support means by radial conducting areas 6c to be supplied with electric power. In the alternative embodiment illustrated in FIG. 9, the deformable element 4 is a beam of small thickness in equilibrium around its transverse median axis. The conducting areas 6a are then arranged at the two ends of the beam, on both the top face and the bottom face, and are connected by conducting longitudinal median areas 6d to the part 5b of the support means to be supplied with electric power.

Figure 15:
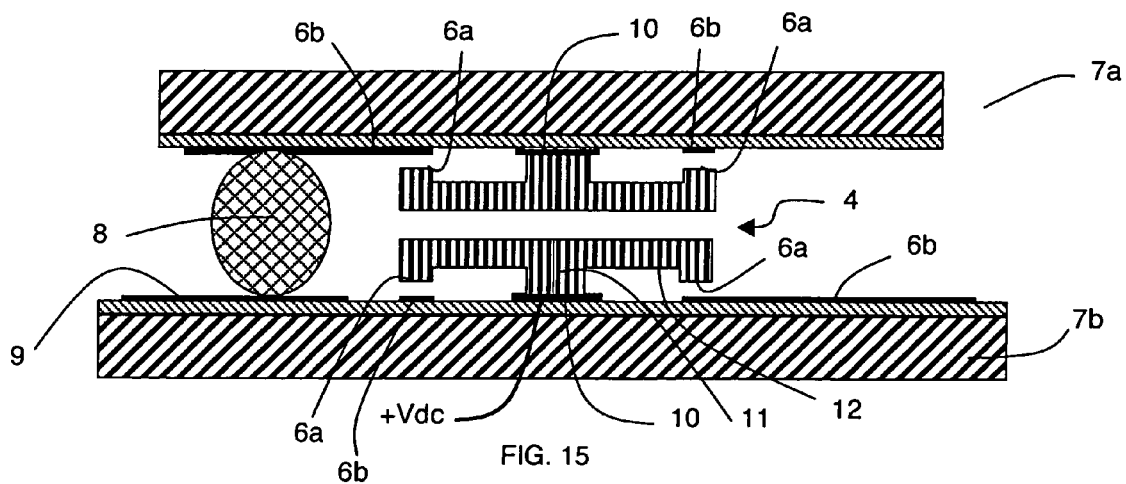

According to a particular embodiment represented in FIG. 15, the sensor 2 can be achieved by microelectronics techniques. The rigid body 3 of the sensor 2 is then formed by hybridization of two substrates 7a and 7b arranged face to face and electrically and mechanically connected by conducting balls 8. For better readability a single ball is represented in FIG. 15. Each substrate bears conducting areas 6b and a central power supply contact area 10 on which a central pillar 11 is formed supporting a conducting layer 12. The conducting layer 12 comprises at the ends thereof salient areas facing the substrate, constituting the contact areas 6a. The deformable element 4 is thus formed by the combination of two half-elements each formed by a conducting layer 12 supported by a central pillar 11 and respectively associated with the substrates 7a and 7b. The conducting layers 12 of the two half-elements are preferably separated by a space, as represented in FIG. 15.

One of the substrates, 7b in FIG. 15, in addition comprises output electrical contact areas 9 of the sensor. Each sensor comprises four areas 9 respectively connected to the different conducting areas 6b of the sensor so as to enable the corresponding signals S0 to S3 to be transmitted to the electronic processing circuit 15. The balls 8 constitute the electrical interconnection between the conducting areas 6b of the substrate 7a and the corresponding output electrical contact areas 9 of the sensor. The number of balls 8 is adapted according to the number of electrical interconnections to be made and to the mechanical strength required for the sensor after the two substrates 7a and 7b have been assembled.

Figure 12:
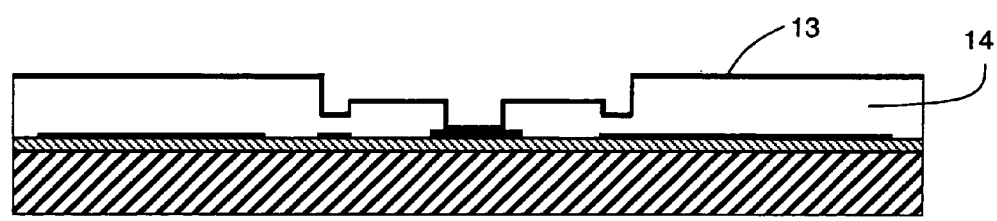
Figure 13:
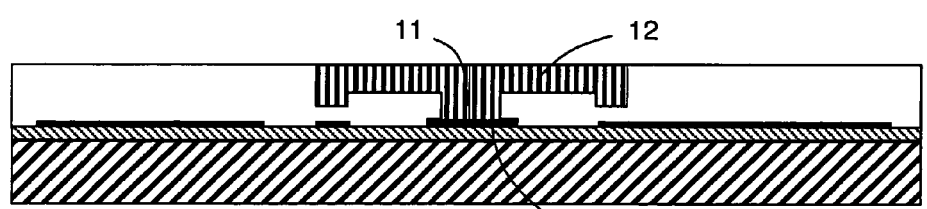
Figure 14:
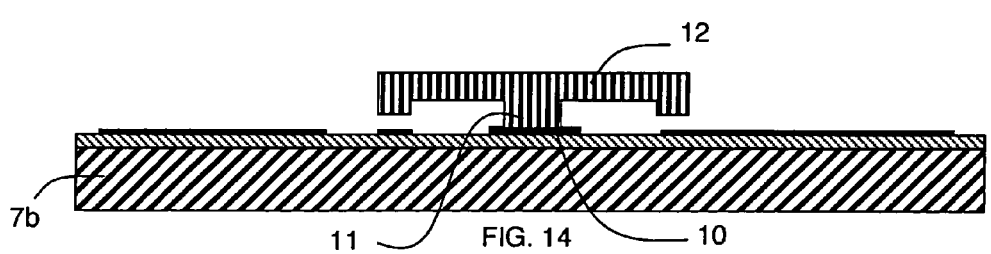

A particular embodiment of a sensor according to FIG. 15 will be described in greater detail with regard to FIGS. 11 to 15. First of all (FIG. 11), the conducting areas 6b, the output electrical contact areas 9 if any and the power supply contact areas 10 are achieved in the form of metallic contacts on the substrates 7a or 7b. The substrates 7a and 7b are preferably made of silicon oxide with an oxide layer 16 having a thickness of about 1 micrometer for example. The metallic contacts are preferably made from a metal that does not oxidize, such as gold (Au) or an iron and nickel alloy (FeNi). A sacrificial layer 14, for example made of resin or silicon oxide ($SiO_2$), is then deposited on the substrate and etched by any suitable means so as to form a mold for the pillar 11 and the membrane 12. As represented in FIG. 12, a conducting sub-layer 13 is then deposited on the etched sacrificial layer 14. The conducting sub-layer 13 is preferably made from a metal that does not oxidize (Au, FeNi). The pillar 11 and the conducting layer 12, for example made of iron-nickel alloy, are then formed on the power supply contact area 10 by electrolytic growth. Polishing is performed to smooth the surface and to eliminate the conducting sub-layer 13 at the periphery of the conducting layer 12 (FIG. 13). Then (FIG. 14), elimination of the sacrificial layer 14 enables the deformable half-element associated with the substrate 7b to be obtained. Then the balls 8 are formed notably on the output electrical contact areas 9 of the substrate 7b. Then, as shown in FIG. 15, hybridization of the two substrates 7a and 7b, arranged face to face, is performed by a flip-chip process, i.e. the substrate 7a is turned and fixed onto the substrate 7b bearing the balls 8. The balls thus enable the electrical tracks to be made to transit from the top substrate 7a to the bottom substrate 7b and enable all the contacts to be easily taken. They also provide a good mechanical strength of the assembly.

The detector described above therefore comprises three identical sensors that are each sensitive to a rotation and a translation and that each have five states, represented in FIGS. 3 to 7. It thus enables both the type of movement and the direction thereof to be determined. Moreover, each sensor is insensitive to the vibrations that occur in the other directions than those to which it is sensitive. Furthermore, as the detector uses binary states, it does not require any calibration.

The detector according to the invention has the faculty of detecting impulses, over a certain threshold, and not continuous signals, on six degrees of freedom with only three position sensors. The presence of the detection threshold enables the device to be used with respect to a relative environment, as is done for a mouse when it is off the mat, and enables new computer navigation modes to be envisaged. In addition, by making use of MEMS (Micro Electro Mechanical System) type micro-technologies, it is possible to achieve very low costs and small overall dimensions. The detector can therefore fit into the user's hand and can easily be integrated in portable personal tools, in particular telephones, or a pocket PDA (personal digital assistant), to enrich their functionalities.

The invention is not limited to the embodiments described above. In particular, the three axes X, Y and Z may not be orthogonal.

The invention claimed is:

1. A movement detector having six degrees of freedom comprising:
   a support; and
   three position sensors arranged on the support according to three orthogonal axes, each sensor comprising:
      a rigid body having two opposing inside walls:
      conducting areas arranged on the rigid body, the conducting areas comprising four conducting areas arranged such that two of the conducting areas are arranged on one of the inside walls and two of the conducting areas are arranged on the opposing inside wall; and
      an electrically conducting deformable element that is isolated from the conducting areas when the deformable element is in a rest position, and the deformable element moving from the rest position to an active position in response to a high-speed movement of predetermined direction and orientation,
   wherein the deformable element associated with each sensor is in equilibrium around a central part of the deformable element,
   wherein the deformable element responds, to a translation along a predetermined axis by bending, causing ends of the deformable element to substantially simultaneously and temporarily contact two conducting areas on a same inside wall, and wherein the deformable element responds to a rotation around a predetermined axis by pivoting, causing the ends of the deformable element to substantially simultaneously and temporarily contact two conducting areas arranged on opposing inside walls.

2. The detector according to claim 1, further comprising an electronic processing circuit connected to the conducting areas of the three sensors.

3. The detector according to claim 1, wherein the deformable element is a beam in equilibrium around transverse median axis of the beam.

4. The detector according to claim 3, wherein the beam comprises conducting areas arranged at the ends of the beam.

5. The detector according to claim 1, wherein the deformable element is a disc in equilibrium around central axis of the disc.

6. The detector according to claim 5, wherein the disc comprises a peripheral conducting area on each face of the disc.

7. The detector according to claim 1, wherein the deformable element of each of the three sensors is electrically connected to a power supply contact area arranged on the rigid body of the corresponding sensor.

8. The detector according to claim 1, wherein the deformable element of each of the three sensors is in an equilibrium position corresponding to the rest position of the corresponding sensor for any movement having an acceleration less than or equal to the force of gravity G.

9. The detector according to claim 1, wherein the rigid body of each of the three sensors comprises two substrates arranged face to face, connected by balls constituting an electrical interconnection between the conducting areas of one of the substrates and output electrical contact areas formed on the other substrate.

10. The detector according to claim 9, wherein the deformable element includes two deformable half-elements, each of the deformable half-elements corresponding to one of the substrates and comprising a conducting layer, the conducting layer being supported by a central pillar, wherein the central pillar is formed on a central power supply contact area, that is formed on the corresponding substrate.

11. A method for production of each of the three sensors according to claim 10, achieved by microelectronics techniques, the method comprising:

forming conducting areas and power supply areas on each of the substrates;

forming an output electrical contact areas on one of the substrates;

forming a central pillar on each of the substrates, the central pillar contacting the power supply contact area and supporting a conducting layer that serves as the deformable half-element;

installing balls on the output electrical contact areas; and hybridizing the two substrates arranged face to face.

* * * * *